Patented Oct. 16, 1945

2,386,847

UNITED STATES PATENT OFFICE 2,386,847

AZO DYESTUFFS OF THE STILBENE SERIES

William S. Eagle, Buffalo, N. Y., assignor to Allied Chemical & Dye Corporation, New York, N. Y., a corporation of New York No Drawing. Application April 22, 1942,
Serial No. 440,088

4 Claims. (Cl. 260—143)

This invention relates to a novel azo dyestuff composition of the stilbene series and more particularly to such a dyestuff composition produced by condensing 2-(4'-amino-benzene-azo)-naphthalene-6,8-disulfonic acid with 4,4'-dinitro-stilbene-2,2'-disulfonic acid.

It is known that dyestuffs can be obtained by condensing 4,4'-dinitro-stilbene-2,2'-disulfonic acid with amino-azo compounds containing a benzene and a naphthalene nucleus, in an aqueous alkaline medium at elevated temperatures, and that the dyestuff compositions of the stilbene series, resulting from such condensations under super-atmospheric pressure, can be converted to related dyestuffs by subjecting them to oxidation.

It is also known that 4,4'-dinitro-stilbene-2,2'-disulfonic acid can be condensed with amino-azo compounds of the benzene series, in aqueous alkaline solutions at elevated temperatures, and that upon treatment of the resulting condensation products with alkaline reducing agents, and purification of the reduced compositions, dyestuffs are obtained which yield orange to red shades, particularly on cotton, fast to chlorine and, in some cases, to light.

I have discovered that a dyestuff composition produced by condensing the particular intermediate, 2-(4'-amino-benzene-azo)-naphthalene-6,8-disulfonic acid, with 4,4'-dinitro-stilbene-2,2'-disulfonic acid by means of aqueous alkali and further treatment of the condensation mass with a mild reducing agent in an aqueous solution of an alkali metal hydroxide, dyes cellulosic fiber, especially cotton, as well as paper and leather, directly in yellowish orange to red-orange shades, which are remarkably fast, not only to chlorine, but also to light and washing. Under conditions generally used for dyeing cellulosic fiber, the dyestuff composition of the invention leaves cellulose acetate fiber unstained.

A dyestuff composition of this invention may be prepared by heating a mixture of the aforesaid amino-benzene-azo-naphthalene-disulfonic acid and dinitro-stilbene-disulfonic acid in the proportions of from 2 to 3 mols of the former to 2 to 3 mols of the latter, preferably in substantially equimolecular proportions, in an aqueous alkaline condensing medium, for instance a solution of caustic soda containing less than 8 parts and preferably from 2 to 4 parts sodium hydroxide per 100 parts of solution, at elevated temperatures within the limits of about 90° to about 100° C., preferably from 95° to 98° C., until the mixture no longer yields more than a faint test for either of said intermediates.

The resulting condensation product of this primary condensation treatment is then subjected to an additional or secondary condensation by the action of a mild reducing agent, such as sodium sulfide in aqueous alkaline solution at temperatures of the same order as those used in the primary condensation. The secondary condensation results in an orange dyestuff which, as the condensation nears completion, attains the characteristic of imparting to cotton an increasingly redder and stronger orange shade. A condensation treatment with aqueous, mild reducing agent beyond the apparent point of complete condensation appears to disrupt some of the dyestuff, causing loss of yield of final dyestuff. The decomposition becomes evident by reappearance in the reaction mixture of an amino azo compound which sufficiently resembles the original amino azo component 2-(4'-amino-benzene-azo)-6,8-naphthalene disulfonate to be detected in the reaction mixture by a suitable test like that included in Example 1 hereinafter described. Usually, the secondary condensation is continued until the desired tone of orange shade is obtained and not beyond the point where reformed amino azo compound becomes detectable in the reaction mixture.

Thereafter the excess alkali in the reaction mixture is preferably neutralized and the dyestuff composition may then be precipitated from the mixture by salting it out, and separated from the mother liquor in the form of a filter cake which may be dried.

If desired, the product of the primary condensation can be separated from the condensation-reaction mixture, for instance by salting it out, before it is converted to the dyestuff of this invention by further condensation with a mild reducing agent in an aqueous solution of alkali metal hydroxide containing less than 8 parts of the hydroxide and preferably from 2 to 4 parts hydroxide per 100 parts of solution. However, I have found that such separation of the intermediate condensation product is unnecessary in order to obtain a dyestuff having the advantageous properties hereinbefore set forth, notwithstanding the general experience of the art that simplification of the process to eliminate the step of separating the first condensation product from the reaction mixture yields more complex dyestuff compositions, usually containing as constituents materials which impair the fastness of the shades produced on materials dyed with the said compositions to the agencies of light, chlorine, or washing, or which stain organic derivatives of cellulose, for example cellulose acetate. Accordingly I prefer, in the interest of economy and convenience, to carry out the alkaline condensation and the subsequent alkaline treatment with a mild reducing agent in the same reaction mixture, my final dyestuff composition being isolated by precipitation from the mixture after the latter treatment.

The reactions occurring in the preparation of the dyestuff composition of this invention are not fully understood nor is its exact chemical composition known. The final composition is probably a mixture containing polyazo-stilbene compounds, some of which contain an azoxy group. These compounds are probably salts of acids which contain a plurality of residues having the formula:

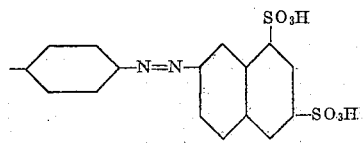

and a plurality of residues having the formula:

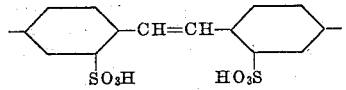

said residues being interconnected by azo or azoxy linkages.

The following equations probably illustrate reactions which result in the formation of some of the azoxy components of the final dyestuff composition, using caustic soda as the primary condensing agent and a solution of sodium sulfide in dilute aqueous caustic soda as the secondary condensing agent:

pound with an equimolecular proportion of anilino-methane-omega-sulfonic acid in weakly acid solution, saponifying the resulting azo compound by heating it with aqueous caustic soda solution at 100° C. until no perceptible odor of formaldehyde remains, and salting out the resulting amino-azo compound with common salt, are slurried together with 85.3 parts of 4,4'-dinitro-stilbene-2,2'-disodium sulfonate in 1000 parts of water. The mixture is heated to 50° C. and 81 parts of a 50% aqueous caustic soda solution are added. The mixture is then diluted with water to a volume corresponding to that of 1400 parts water and heated to 95°–98° C. The mixture is held at this temperature for about three hours, or longer if necessary, to insure substantially complete condensation of the reagents.

The following tests may be used to determine whether or not the condensation is substantially complete: 3 or 4 drops of the reaction mixture are diluted with 3 to 4 cc. of water, and a piece of white filter paper is saturated with the resulting solution. The filter paper is then spotted with a freshly prepared suspension of zinc dust in 3% aqueous caustic soda solution. A pink color, developed at the edge of the spot, indicates the presence of unreacted dinitro-stilbene-disulfonic acid. A second piece of filter paper is cross-streaked with the aforesaid diluted reaction mixture and with muriatic acid. If a pink color is developed by the acid, the presence of the uncondensed amino-azo compound is indicated.

When the foregoing tests indicate, by development of only faint colorations, that this primary condensation reaction is substantially complete, a solution of 27 parts of sodium sulfide (60% chips) in 50 parts water is added to the condensation mixture over a period of about 1½ hours, while

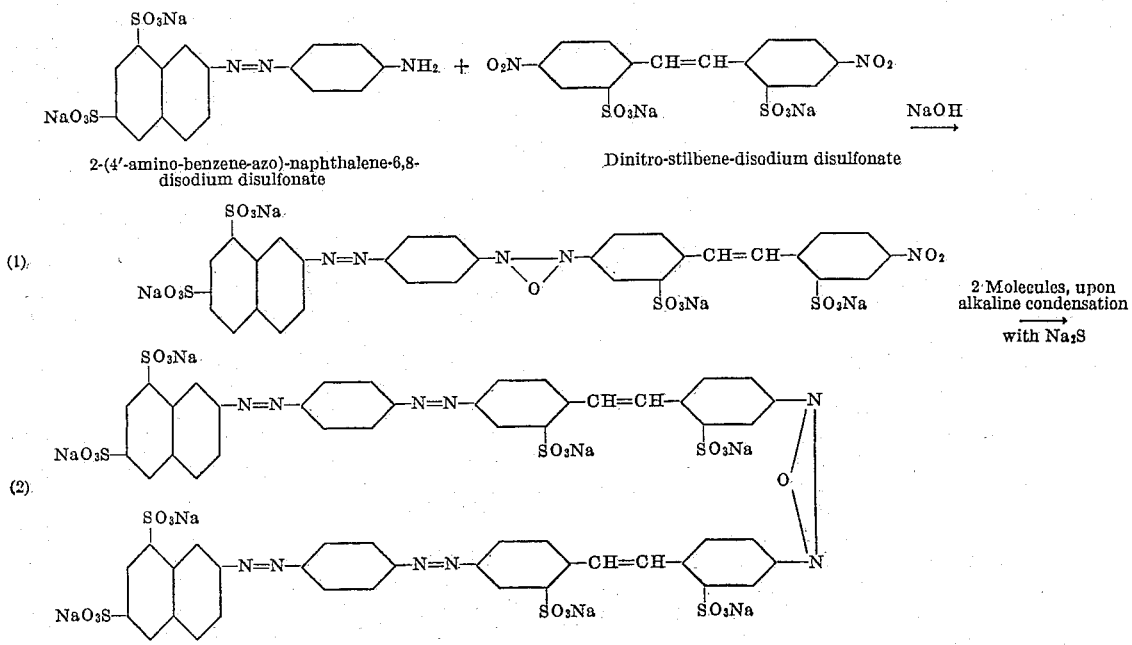

The following example, in which parts are by weight, serves to illustrate one method of preparing the stilbene-azo dyestuff composition of this invention.

*Example*

81.3 parts of 2-(4'-amino-benzene-azo)-naphthalene-6,8-disodium sulfonate, prepared for instance by diazotizing 2-amino-naphthalene-6,8-disulfonic acid, coupling the resulting diazo compound maintaining the temperature of the reaction constantly between 95° and 98° C. After addition of the sodium sulfide solution is complete, the mixture is held within the aforesaid temperature range for an additional ¼ hour. Then 108 parts of 20° Bé. muriatic acid are added to neutralize the excess caustic alkali. The mixture is finally adjusted to show a weak alkalinity upon testing with Brilliant Yellow paper. 180 parts of common salt (NaCl) are then added, and the mixture is agitated until it has cooled to about 15° to 25° C. The resulting slurry is filtered, and the filter cake is dried at about 70° C. in an air drier.

The resulting composition is a direct dyestuff for cotton and other cellulosic fibers, for paper and leather, producing orange shades thereon of excellent fastness to light, washing, and chlorine, while under corresponding dyeing conditions, it leaves cellulose acetate fiber unstained.

In the procedure of the foregoing example alkali metal hydroxides other than caustic soda may be used in the primary condensation and other reducing agents which are effective in aqueous alkaline solution and exert a mild reducing action therein, for instance dextrose, zinc dust, glycerine, or the like, or other alkali metal sulfides, may be substituted for sodium sulfide in the secondary condensation and reduction.

The amount of mild reducing or condensing agent, which is added to effect the secondary condensation is adjusted according to the yellowish or reddish shade of orange which is desired. The maximum amount which is added preferably should not exceed that which is required to effect the condensation completely, as evidenced by the appearance in the reaction mass of reformed amino azo compound which can be detected by the hereinbefore described streak-test with muriatic acid. The use of less than this desirable maximum amount of secondary condensing agent results in a dyestuff which imparts a yellower shade of orange than that produced with the maximum amount of the said condensing agent; addition of more than said maximum amount of secondary condensing agent causes decomposition of the desired dyestuff, as evidenced firstly by the increasing amount of reformed amino azo compound which appears in the reaction mass and is removed subsequently from the final product, and secondly by lower yield of the final dyestuff. The dyestuff composition may be precipitated from the reaction mixture by various means known in the art, for instance by adding other water-soluble salts capable of reducing the solubility of the dyestuff in the same manner as common salt.

Since the dyestuff composition of this invention is a direct dye for cellulosic fiber, especially cotton, but does not stain cellulose acetate fiber, it can be advantageously used for cross-dyeing union fabrics containing both cellulosic and cellulose acetate fibers.

Variations and modifications within the scope of this invention may be made in the procedure hereinbefore described; hence the foregoing procedural details are to be interpreted as illustrative, and not in a limiting sense.

I claim

1. An azo dyestuff composition of the stilbene series produced by condensing from 2 to 3 moles of 2-(4'-amino-benzene-azo)-naphthalene-6,8-disulfonic acid with from 2 to 3 moles of 4,4'-dinitro-stilbene-2,2'-disulfonic acid in an aqueous alkaline solution at a temperature within the limits of about 90° to about 100° C., and further condensing the resulting condensation products in an aqueous alkaline solution containing a mild reducing agent at a temperature within the limits of about 90° to about 100° C.

2. An azo dyestuff composition of the stilbene series produced by condensing 2-(4'-amino-benzene-azo)-naphthalene-6,8-disulfonic acid with a substantially equimolecular proportion of 4,4'-dinitro-stilbene-2,2'-disulfonic acid in an aqueous alkali metal hydroxide solution containing not more than 8 parts by weight of alkali metal hydroxide per 100 parts of solution at a temperature within the limits of about 90° to about 100° C. and further condensing the resulting condensation products in an aqueous solution of an alkali metal hydroxide and an alkali metal sulfide at a temperature within the limits of about 90° to about 100° C.

3. An azo dyestuff composition of the stilbene series produced by condensing from 2 to 3 moles of 2-(4'-amino-benzene-azo)-naphthalene-6,8-disulfonic acid with from 2 to 3 moles of 4,4'-dialkaline solution at a temperature within the limits of about 90° to about 100° C., adding a mild reducing agent to the resulting reaction mixture while maintaining the aforesaid temperature to effect further condensation and reduction of the condensation products contained therein, salting out the dyestuff from the reaction mixture, and separating the precipitated dyestuff from the mother liquor.

4. An azo dyestuff composition of the stilbene series produced by condensing 2-(4'-amino-benzene-azo)-naphthalene-6,8-disulfonic acid with a substantially equimolecular proportion of 4,4'-dinitro-stilbene-2,2'-disulfonic acid in an aqueous caustic soda solution containing from 2 to 4 parts by weight of caustic soda per 100 parts of solution at 95° to 98° C., adding sodium sulfide to the condensation mixture while maintaining the aforesaid temperature to effect further condensation and reduction of the initial condensation products, substantially neutralizing the excess alkali in the resulting reaction mixture, precipitating the resulting dyestuff from said mixture by addition of common salt, and separating the precipitated dyestuff from the mother liquor.

WILLIAM S. EAGLE.